No. 661,890. Patented Nov. 13, 1900.
M. O'CONNELL.
GRAIN HARVESTER.
(Application filed Apr. 13, 1900.)
(No Model.) 3 Sheets—Sheet 1.

Witnesses
Inventor
Martin O'Connell
by James J. Sheehy
Attorney

No 661,890. Patented Nov. 13, 1900.
M. O'CONNELL.
GRAIN HARVESTER.
(Application filed Apr. 13, 1900.)

(No Model.) 3 Sheets—Sheet 2.

Witnesses
Inventor
Martin O'Connell
by James J. Shuhy
Attorney

No. 661,890. Patented Nov. 13, 1900.
M. O'CONNELL.
GRAIN HARVESTER.
(Application filed Apr. 13, 1900.)
(No Model.) 3 Sheets—Sheet 3.

Witnesses
Inventor
Martin O'Connell
by James J. Sheehy
Attorney

THE NORRIS PETERS CO., PHOTO-LITHO., WASHINGTON, D. C.

UNITED STATES PATENT OFFICE.

MARTIN O'CONNELL, OF MINONK, ILLINOIS.

GRAIN-HARVESTER.

SPECIFICATION forming part of Letters Patent No. 661,890, dated November 13, 1900.

Application filed April 13, 1900. Serial No. 12,733. (No model.)

*To all whom it may concern:*

Be it known that I, MARTIN O'CONNELL, a citizen of the United States, residing at Minonk, in the county of Woodford and State of Illinois, have invented new and useful Improvements in Grain-Harvesters, of which the following is a specification.

My invention relates to improvements in grain-harvesters, and has for its general object to provide an apparatus attached to and forming part of a harvester and adapted to receive bound sheaves of grain from the deck-board of the harvester and automatically shape and bind the same into shocks and discharge said shocks at intervals upon the ground.

Another object is to provide a shocker comprising a receptacle having an adjustable bottom or base-board whereby it may be adapted to properly handle sheaves of grain of different lengths.

Another object is to provide a shocker adapted to be readily connected to and used in conjunction with harvesters such as are at present in use.

Other objects and advantages of the invention will be fully understood from the following description and claims when taken in conjunction with the annexed drawings, in which—

Figure 1:
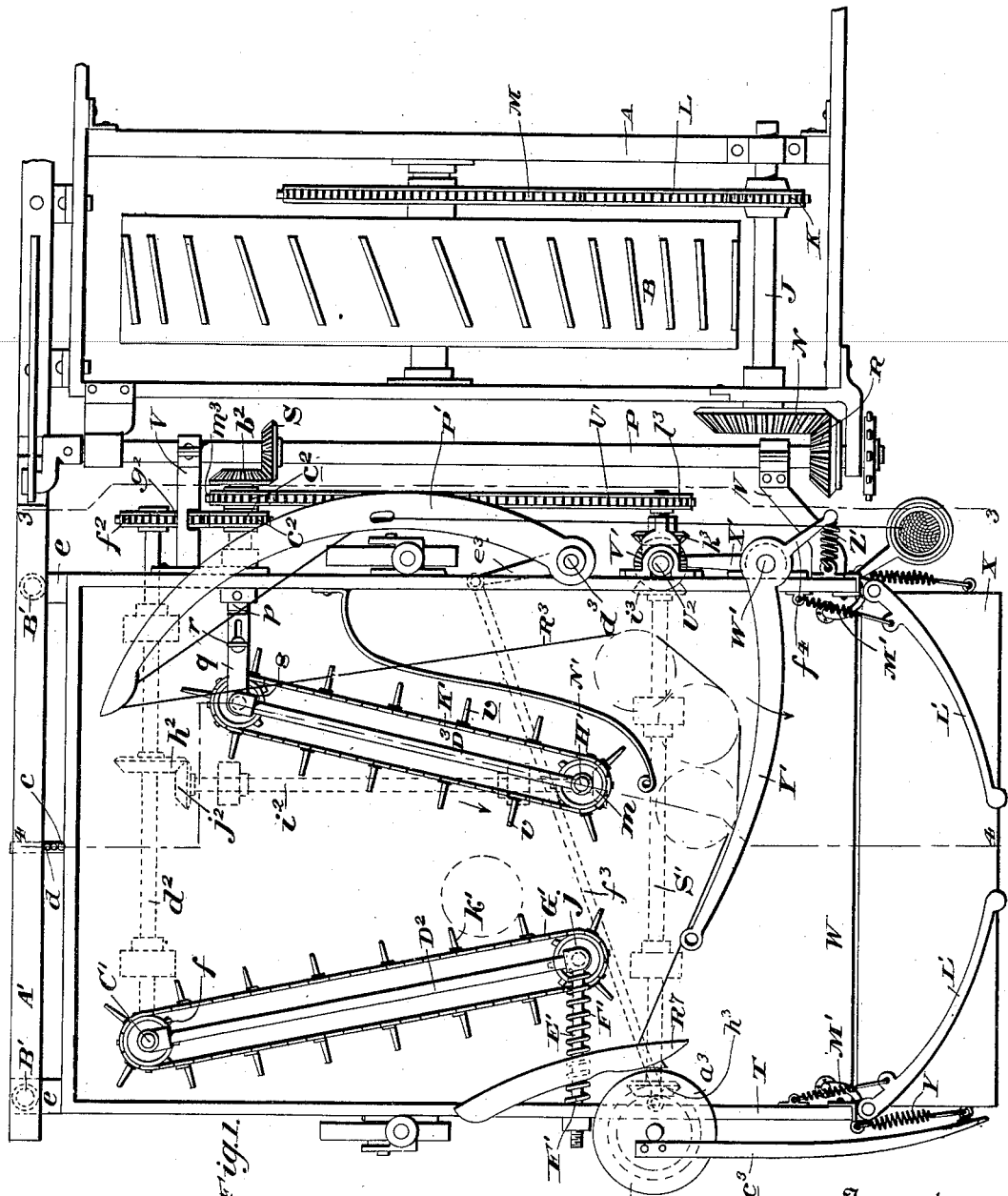
Figure 2:
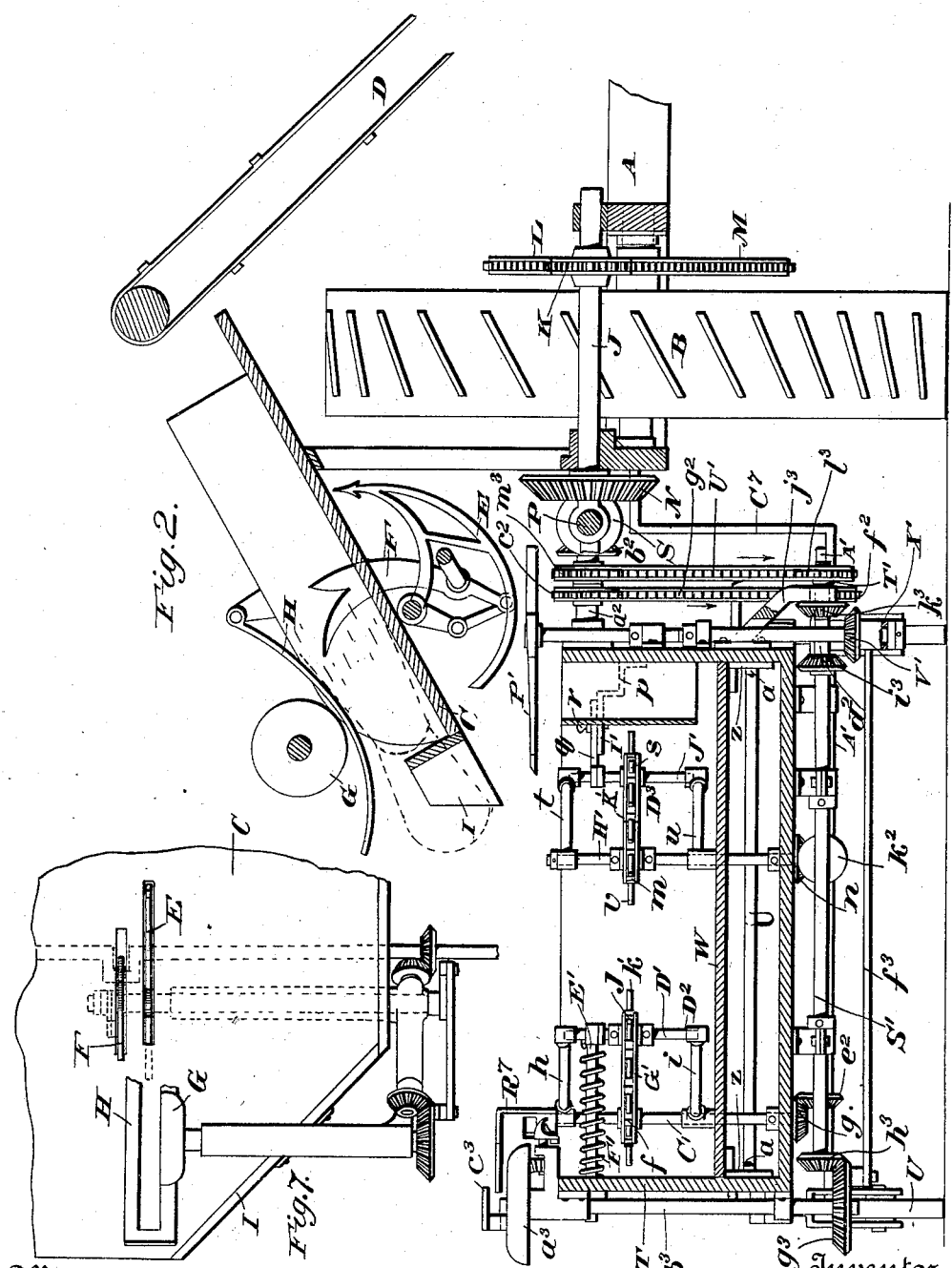
Figure 3:
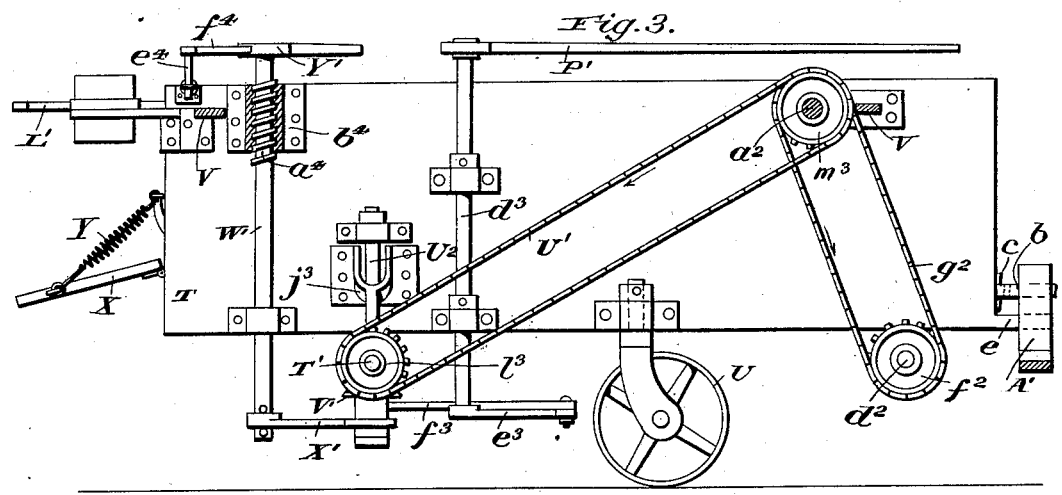
Figure 4:
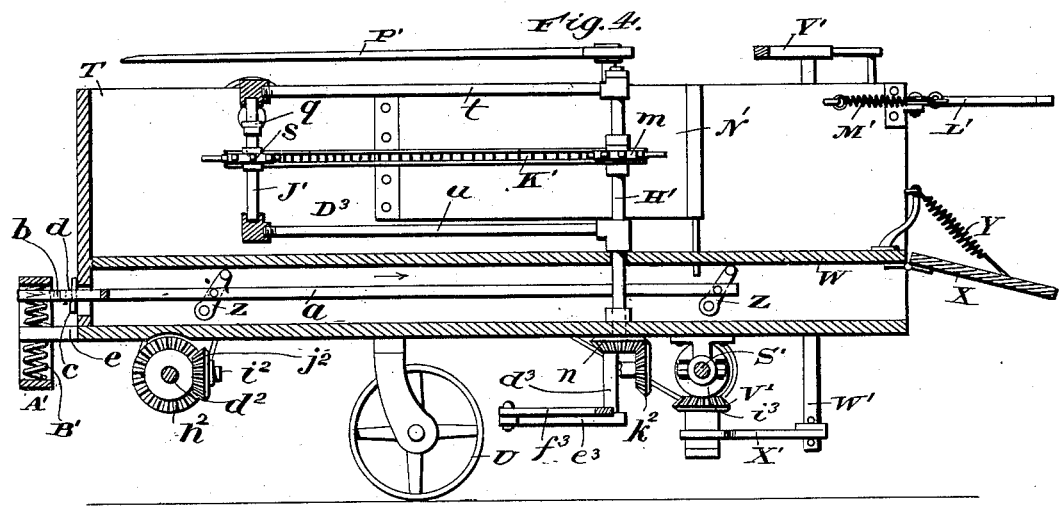
Figure 5:
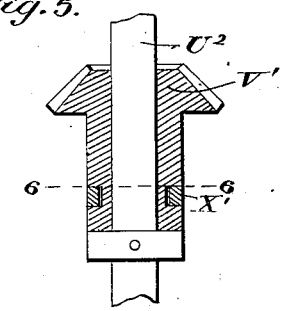
Figure 6:
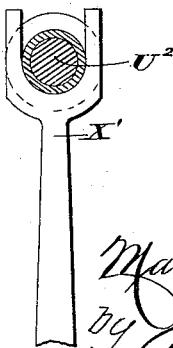

Figure 1 is a plan view illustrating a portion of a harvester equipped with my improved shocker. Fig. 2 is a transverse section of the same. Fig. 3 is a longitudinal section taken in the plane indicated by the broken line 3 3 of Fig. 1. Fig. 4 is a longitudinal section of the shocker, taken in the plane indicated by the broken line 4 4 of Fig. 1. Fig. 5 is an enlarged vertical section illustrating the adjustable gear forming parts of my improvements. Fig. 6 is a detail section taken in the plane indicated by the broken line 6 6 of Fig. 5. Fig. 7 is a detail top plan view of the binding mechanism.

In the said drawings similar letters designate corresponding parts in all of the several views, referring to which—

A is a portion of the main frame of a harvester; B, the main traveling wheel thereof;
C, the deck-board; D, the draper-carrier for conveying cut grain to the deck-board; and E, F, G, and H are the needle, the packer, the knotter, and guide, respectively, of a binding mechanism. This binding mechanism is similar in construction to the ordinary well-known Appleby binding mechanism, with the exception that it comprises but a single packer F, which is arranged adjacent to one side of the deck-board and is designed, in conjunction with the inclined board I at the lower end of the deck-board, to cause the sheaves of wheat or other grain to leave the deck-board in an endwise fashion, and hence drop in an upright position in the receptacle of the shocker, hereinafter described.

J is a transversely-disposed shaft which is journaled in the frame A and is provided at its inner end with a sprocket-wheel K, connected by a chain L with a sprocket-wheel M, fixed with respect to the traveling wheel B, and is also provided at its outer end with a miter-gear N.

P is a longitudinally-disposed shaft which is journaled in a suitable bearing on frame A and is provided with a miter-gear R, intermeshed with the gear N, and is also provided at an intermediate point of its length with a miter-gear S, and T is the box or receptacle of my improved shocker, which is preferably of steel and open at its rear end, as best shown in Figs. 1 and 4. This box T is supported by caster or other suitable wheels U and is connected by lateral arms V with the shaft P, the said arms having boxes receiving the shaft, as shown, so as to enable the shocker to freely accommodate itself to inequalities of the ground.

W is a false bottom or base-board which is arranged in the box T and is adjustable verticalle, so as to adapt the shocker to properly handly grain of different lengths. This bottom W is provided at its rear end with a hinged extension X, which is normally held in the position shown in Fig. 4 by coiled springs Y and is adapted when the weight of a shock is imposed thereon to give and permit the shock to slide easily to the ground. The said false bottom W is supported by arms Z, pivotally connected to the opposite side walls of the box T, the arms being connected at an intermediate point of their length to a rectangular frame *a*, (see Fig. 4,) which has a handle *b* extended through an opening in the rear wall of the box T. By reason of this construction it will be seen that the operator is enabled by grasping the handle $b$ and moving the frame $a$ in the direction indicated by arrow in Fig. 4 to lower the bottom W and enable the shocker to better handle long grain, and it will also be seen that the operator is enabled by moving frame $a$ in the direction opposite to that indicated by arrow to raise the bottom W, and thereby adapt the shocker to capably handle short grain. The frame $a$, and consequently the arms Z and false bottom W, are held against casual movement by a pin $c$, removably placed in one of a series of apertures $d$ in the handle $b$ and adapted to engage the front wall of the box T or by any other suitable means.

The box T is provided at its front end with arms $e$, between which and the upper and lower bars of a rectangular frame A' coiled springs B' are interposed, as best shown in Figs. 1 and 4. The frame A' terminates at its inner end in an arm $C^7$, (see Fig. 2,) which is rigidly connected to the frame A of the harvester. By virtue of this construction it will be observed that the rear end of the box T is securely connected to the frame A of the harvester and yet is yieldingly supported, so as to prevent the transmission of shock or jar to the mechanism of the shocker when the harvester is traveling over rough ground.

C' is a vertical shaft journaled in the bottom of the box T and extending loosely through an aperture in the false bottom W. This shaft C' is provided at an intermediate point of its length with a sprocket-wheel $f$ and below the bottom of the box with a miter-gear $g$ and is designed in conjunction with upper and lower bars $h\ i$, in the rear ends of which it is journaled, and a shaft D', journaled in the forward ends of the bars, to form a frame $D^2$. The shaft D' is equipped with a sprocket-wheel $j$ and is journaled in a rod E', which extends loosely through one side wall of the box T and carries a coiled spring F', which is interposed between the shaft and said wall of the box, and is provided at the outer side of the box with a nut, as shown in Fig. 1.

G' is a sprocket-belt which takes around the sprocket-wheels $f\ j$ and is provided at intervals in its length with fingers $k'$, designed to engage bound sheaves of grain and feed the same forward on the bottom W.

H' is an upright shaft which is journaled in the bottom of the box T and extends loosely through the false bottom W and is provided at an intermediate point of its length with a sprocket-wheel $m$ and at its lower end with a miter-gear $n$.

I' is an adjustable bracket made up of a section $p$, fixedly connected to one side wall of the box T, and a section $q$, adjustably connected by a set-screw $r$ to the section $p$. J' is a shaft journaled in the section $q$ of the bracket and provided with a sprocket-wheel $s$, and $t\ u$ are upper and lower longitudinal bars, in which the shafts H' J' are journaled and which serve in conjunction with said shafts to form a frame $D^3$.

K' is a sprocket-belt which takes around the sprocket-wheels $m\ s$ and is provided with fingers $v$, designed to engage bound sheaves of grain and move the same forwardly on the bottom W of the shocker. By reason of the shaft J', forming part of the frame $D^3$, being mounted in the adjustable bracket I' it will be readily observed that the forward end of the frame $D^3$, carrying the belt K', may be fixed at various distances from the frame $D^2$ and the belt G' carried thereby, so as to enable the fingers $v$ of said belt K' to properly engage and advance the bound sheaves of grain. It will also be observed that the frame $D^2$ is normally held by the spring F' in such position as to enable the fingers $k'$ of the belt G' to properly engage and advance the bound sheaves of grain, and yet the rear end of the said frame is free to move against the action of the spring F' away from the rear end of the frame $D^3$, so as to prevent the space between the two feed-belts G' K' becoming choked.

L' L' are retaining-arms, which are pivotally connected to the rear ends of the side walls of the box T and are normally held in the position shown in Fig. 1 by coiled springs M'. These retaining-arms have for their purpose to prevent the bound shocks of grain from toppling over as they are discharged from the shocker and insure said shocks being deposited on the ground in an upright position.

When the harvester is in use, motion is transmitted from the shaft C' to drive the belt G' through the medium of gearing which comprises the miter-gear S on the shaft P, a short shaft $a^2$, mounted in bearings on the inner side wall of the box T and having a miter-gear $b^2$, intermeshed with the gear S, and also having a sprocket-wheel $c^2$, a transverse shaft $d^2$, journaled in suitable bearings on the bottom of the box T and having a beveled pinion $e^2$, intermeshed with the beveled gear $g$ on the shaft C', and also having a sprocket-wheel $f^2$ and a sprocket-belt $g^2$, connecting the sprocket-wheels $c^2 f^2$. Motion is transmitted from the shaft $d^2$ to the shaft H' for the purpose of driving the belt K' through the medium of a beveled gear $h^2$ on shaft $d^2$ and a shaft $i^2$, which is provided at one end with a beveled gear $j^2$, intermeshed with the gear $h^2$, and at its opposite end with a beveled gear $k^2$, intermeshed with the beveled gear $n$ on shaft H'.

N' is a sheet-metal shield which is connected to the inner side wall of the box T and interposed between said wall and the belt K'. This shield has for its purpose to prevent the fingers of the belt K' from engaging the sheaves of grain during the forward run of the said fingers and is also designed, as best shown in Fig. 1, to prevent retrograde movement of the sheaves after the same have passed out of engagement with the fingers of the belt K'.

P' is a needle, and Q' is a knotter, which are similar to those embraced in the well-known Appleby binding mechanism, except that they are disposed horizontally. The knotter is arranged behind the usual apertured shield $R^7$, and its rotary portion $a^3$ is fixed on a vertically-disposed shaft $b^3$ and is provided with a horizontally-disposed sweep $c^3$. The needle P' is fixed on a vertically-disposed shaft $d^3$, arranged at the opposite side of the box with reference to the shaft $b^3$. Said shaft $d^3$ is provided at its lower end with a crank-arm $e^3$, (see Fig. 1,) which is connected by a pitman $f^3$ with a combined crank and beveled gear-wheel $g^3$ on the lower end of the shaft $b^3$, whereby it will be seen that when the rotary portion $a^3$ of the knotter is rotated the needle will be swung forwardly for a purpose presently described.

S' is a transversely-disposed shaft journaled in suitable bearings on the under side of the box T and provided at one end with a beveled gear $h^3$, intermeshed with the beveled gear $g^3$, and also provided at its opposite end with a beveled gear $i^3$.

T' is a short shaft journaled in a bracket-arm $j^3$ on the box T in alinement with shaft S' and having a beveled gear $k^3$ and a sprocket-wheel $l^3$, and U' is a sprocket-chain connecting the sprocket-wheel $l^3$ and a sprocket-wheel $m^3$ on the short shaft $a^2$, whereby it will be seen that when the harvester is in motion the short shaft T' will be continuously rotated.

$U^2$ is a shaft connected to and depending from the box T.

V' is a beveled gear movable vertically on the shaft $U^2$ and adapted to be interposed between and intermeshed with the gear-wheels $i^3 k^3$, so as to transmit motion from the continuously-rotating shaft T' to the shaft S'.

W' is a vertical shaft journaled in suitable bearings on the inner side wall of the box T and having a worm-screw $a^4$ arranged in a threaded boxing $b^4$ on said box T.

X' is an arm loosely mounted on the shaft W' and engaging the gear-wheel V', as best shown in Figs. 5 and 6.

Y' is a horizontally-disposed lever fixed at an intermediate point of its length on the upper end of the shaft W' and having a depending branch $e^4$ at the end of its short arm $f^4$, and Z' is a coiled spring interposed between and connecting the said depending branch $e^4$ of the lever and the box T.

When the long arm of the lever Y' is engaged and pressed forwardly by a plurality of sheaves of grain gathered in the rear of it, the shaft W' will be rocked, and by reason of its worm-screw $a^4$ bearing in the threaded boxing $b^4$ will be raised. When the shaft W' is thus raised, the arm X' will move upwardly with it and carry the gear-wheel V' into engagement with the gear-wheels $i^3 k^3$ on the shafts S' and T', respectively. This will result in a sudden rotation of the shaft S', and consequently a sudden rotation of the portion $a^3$ of the knotter Q' and quick swinging movements of the sweep $c^3$ and needle P'.

When the needle P' is thus swung forwardly, it will carry the binding-twine (indicated by $R^3$) around the three (more or less) sheaves of grain in rear of the lever Y' and in conjunction with the knotting mechanism will bind the sheaves into a shock, the twine being cut and the end thereof retained by the knotting mechanism after the manner common to binding mechanism when the needle is swung back to its normal position. After the shock is bound the needle is returned to its normal position (shown in Fig. 1) and the sweep $c^3$ is swung forwardly against the bound shock so as to force the same between the retaining-arms and out of the box. Subsequent to the discharge of the shock from the box T the spring connecting the lever Y' and the box returns the lever Y' to the position shown in Fig. 1, with the result that the gear V' is moved down and out of engagement with the gear-wheels $i^3 k^3$, so as to stop the needle P' and sweep $c^3$ in the position shown until another plurality of sheaves has been caused to push the lever Y' forwardly, when the gear V' will again be raised into engagement with the gear-wheels $i^3 k^3$ and the operation described will be repeated.

The general operation of my improved shocker is as follows: The bound sheaves of grain are discharged from the deck-board of the harvester by the kicker of the sheave-binding mechanism and are dropped in an upright position on the bottom wall W of the box T and between the continuously-traveling feed-belts G' K'. As the sheaves drop into the box the fingers on the said belts advance them rearwardly, and when a plurality have been placed in front of the lever Y' press the said lever backwardly, and thereby raise the gear V' into engagement with the gear-wheels $i^3 k^3$. When the gear V' is thus intermeshed with the gears $i^3 k^3$, the needle P' will be swung forwardly to place the binding-twine around the sheaves of grain and carry said twine to the knotting mechanism, and after the knot is tied and the twine cut the needle is returned to its normal position and the sweep $c^3$ swung around so as to force the bound shock past the lever Y' and out of the box T between the retaining-arms L'. Subsequent to the discharge of the bound shock the lever Y' is returned to the position shown in Fig. 1 and the gear V' is disengaged from the gear-wheels $i^3 k^3$, so as to stop the needle P' and sweep $c^3$ in the position shown in Fig. 1. When the bound shock is forced out between the retaining-arms L', said arms will hold the shock in an upright position and insure its being deposited in such position on the ground.

Notwithstanding the fact that my improved shocker is entirely automatic in operation, it will be observed that it is simple and inexpensive in construction and embodies no parts such as are likely to get out of order after a short period of use.

I have entered into a specific description of the construction and relative arrangement of the parts embraced in this the preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my invention.

Having thus described my invention, what I claim is—

1. In a grain-shocker, the combination of a box open at its rear end, a vertically-adjustable bottom wall arranged in said box and having a hinged spring-supported leaf at its rear end, arms pivotally connected to the side walls of the box and arranged below the adjustable wall, and an endwise-movable frame connected to said arms, and suitable means for adjustably fixing the said frame with respect to the box, substantially as specified.

2. The combination with a harvester; of a shocker comprising a box having forwardly-extending arms, traveling wheels connected with said box at an intermediate point in the length thereof, a transversely-disposed frame connected to the main frame of the harvester and arranged in front of the box, and coiled springs interposed between the upper and lower bars of said transverse frame and the forwardly-extending arms on the shocker-box, substantially as specified.

3. The combination with the main frame of a harvester and a longitudinally-disposed shaft journaled in suitable bearings thereon; of a shocker arranged at one side of the main frame and comprising a box having forwardly-extending arms and also having lateral arms loosely mounted on the longitudinally-disposed shaft, traveling wheels connected with said box at an intermediate point in the length thereof, a transversely-disposed frame connected to the main frame of the harvester and arranged in front of the shocker-box, and coiled springs interposed between the upper and lower bars of said transverse frame and forwardly-extending arms on the shocker-box, substantially as specified.

4. In a grain-shocker, a box having side walls for confining the sheaves of grain, a bottom wall arranged between the side walls and adjustable vertically with respect thereto, a leaf connected in a hinged manner to the rear end of the bottom wall, and a yielding support for the leaf, substantially as and for the purpose set forth.

5. In a grain-shocker, the combination of a box open at its rear end and having side walls for confining the sheaves of grain, a bottom wall arranged between the side walls and adjustable vertically with respect thereto, means for adjusting and adjustably fixing said bottom wall, a leaf connected in a hinged manner to the rear end of the bottom wall, and springs for yieldingly supporting the leaf; said springs being interposed between and connected to the bottom wall and the leaf, substantially as specified.

6. The combination with a harvester; of a shocker comprising a box, one or more traveling wheels disposed below the box at an intermediate point in the length thereof, a support connected to the harvester and disposed adjacent to one end of the box, and a cushion interposed between said support and end of the box, substantially as specified.

7. The combination with the main frame of a harvester; of a shocker disposed at one side of the main frame and comprising a box connected therewith in a hinged manner, one or more traveling wheels disposed below the box at an intermediate point in the length thereof, a support connected to the main frame of the harvester and disposed adjacent to one end of the box, and a yielding support for said end of the box interposed between the same and the support connected to the main frame of the harvester.

8. In a grain-shocker, the combination of a box or receptacle open at one end and having side walls for confining the sheaves of grain, a bottom wall arranged between the side walls and adjustable vertically with respect thereto, a leaf connected in a hinged manner to the rear end of the bottom wall, and a yielding support for the leaf, endless feed-belts arranged in said box, the shock-binding mechanism comprising the horizontally-disposed needle mounted on a shaft at one side of the box, and the knotter having a rotary portion mounted on a shaft at the opposite side of the box and provided with a horizontally-disposed sweep, gearing for transmitting motion to the endless feed-belt, gearing for transmitting motion to the needle and knotting mechanism; the latter gearing comprising a stop-motion device, a lever fulcrumed on the box in rear of the feed-belts and connected with the stop-motion device of said gearing, retaining-arms pivotally connected to the side walls of the box at the rear ends thereof, and springs connected to said arms, substantially as and for the purpose set forth.

In testimony whereof I have hereunto set my hand in presence of two subscribing witnesses.

MARTIN O'CONNELL.

Witnesses:
T. E. TURPIN,
M. H. PFAFFER.